(12) United States Patent
Kroll et al.

(10) Patent No.: US 7,119,287 B2
(45) Date of Patent: Oct. 10, 2006

(54) PLATFORM SCALE WITH UNDER-PLATFORM MOUNTED LOAD CELL PROTECTION CASES FOR REDUCING SIDE FORCES

(75) Inventors: William P. Kroll, Medina, MN (US); Randie Evenson, Brooklyn Center, MN (US)

(73) Assignee: Intercomp Company, Minneapolis, MN (US)

( * ) Notice: Subject to any disclaimer, the term of this patent is extended or adjusted under 35 U.S.C. 154(b) by 119 days.

(21) Appl. No.: 10/726,303

(22) Filed: Dec. 1, 2003

(65) Prior Publication Data

US 2005/0115745 A1    Jun. 2, 2005

(51) Int. Cl.
*G01G 19/02* (2006.01)

(52) U.S. Cl. .................. 177/132; 177/DIG. 9
(58) Field of Classification Search ........ 177/132–136, 177/DIG. 9
See application file for complete search history.

(56) References Cited

U.S. PATENT DOCUMENTS

| | | | | |
|---|---|---|---|---|
| 3,741,328 A | * | 6/1973 | Andersson et al. ..... | 177/210 R |
| 4,203,497 A | * | 5/1980 | Harris et al. ................. | 177/134 |
| 4,281,728 A | * | 8/1981 | Dickason et al. ........... | 177/134 |
| 5,359,153 A | * | 10/1994 | Herrmann et al. .......... | 177/126 |
| 5,646,376 A | * | 7/1997 | Kroll et al. .................. | 177/211 |
| 5,894,112 A | * | 4/1999 | Kroll .......................... | 177/134 |
| 6,177,638 B1 | * | 1/2001 | Murray ........................ | 177/133 |

* cited by examiner

*Primary Examiner*—Randy W. Gibson
(74) *Attorney, Agent, or Firm*—Skinner and Associates

(57) ABSTRACT

A tine mounted weighing scale apparatus includes a pair of weighing scale units, each scale unit having a base mountable on one tine of a lifting device. The base has a predetermined number of load cell mounts each providing a deflection gap between a load cell and the base. A platform for contact with a load is disposed above and in operational contact with the base. A load cell is attached to each of the load cell mounts of the base and is positioned between the base and the platform. Each load cell has an engagement member in operational contact with the platform. An electrical control/display and a power supply is connected to the pair of weighing scale units for displaying the total weight supported by the scale apparatus.

23 Claims, 10 Drawing Sheets

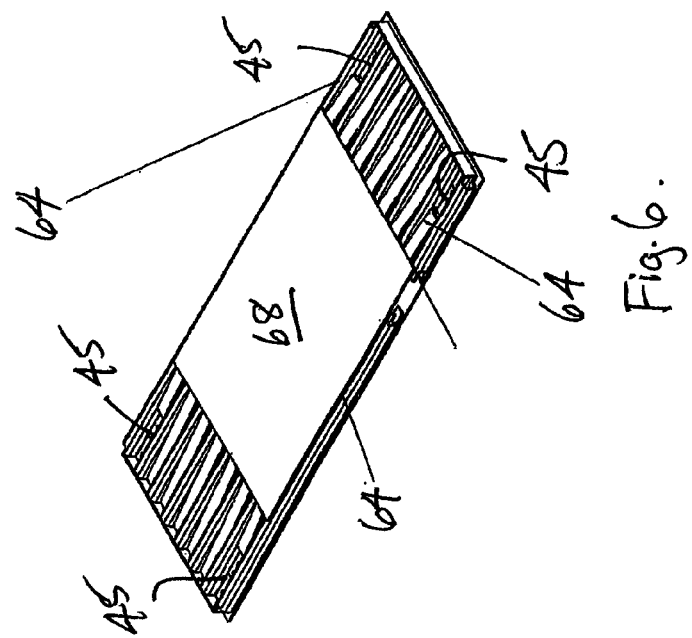
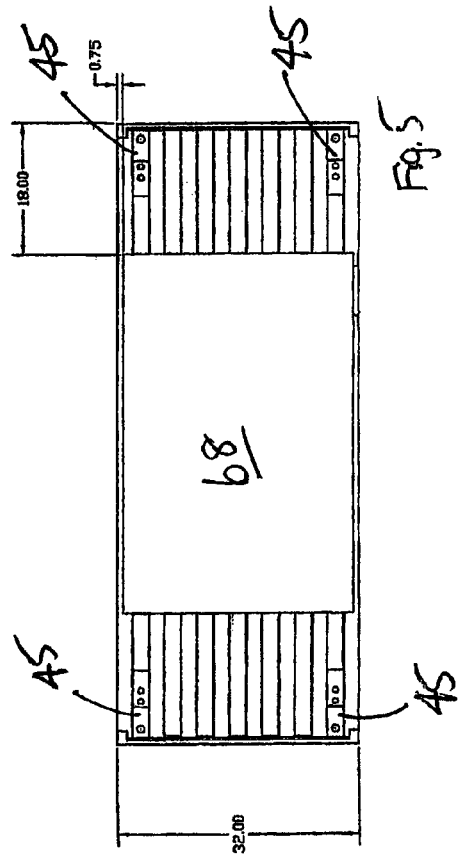
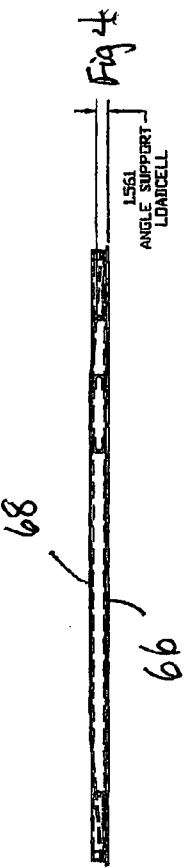
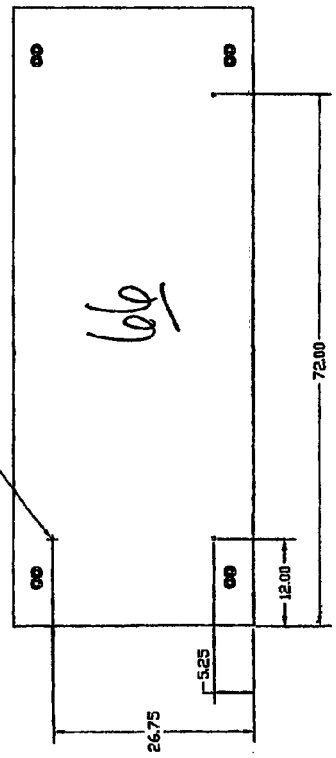

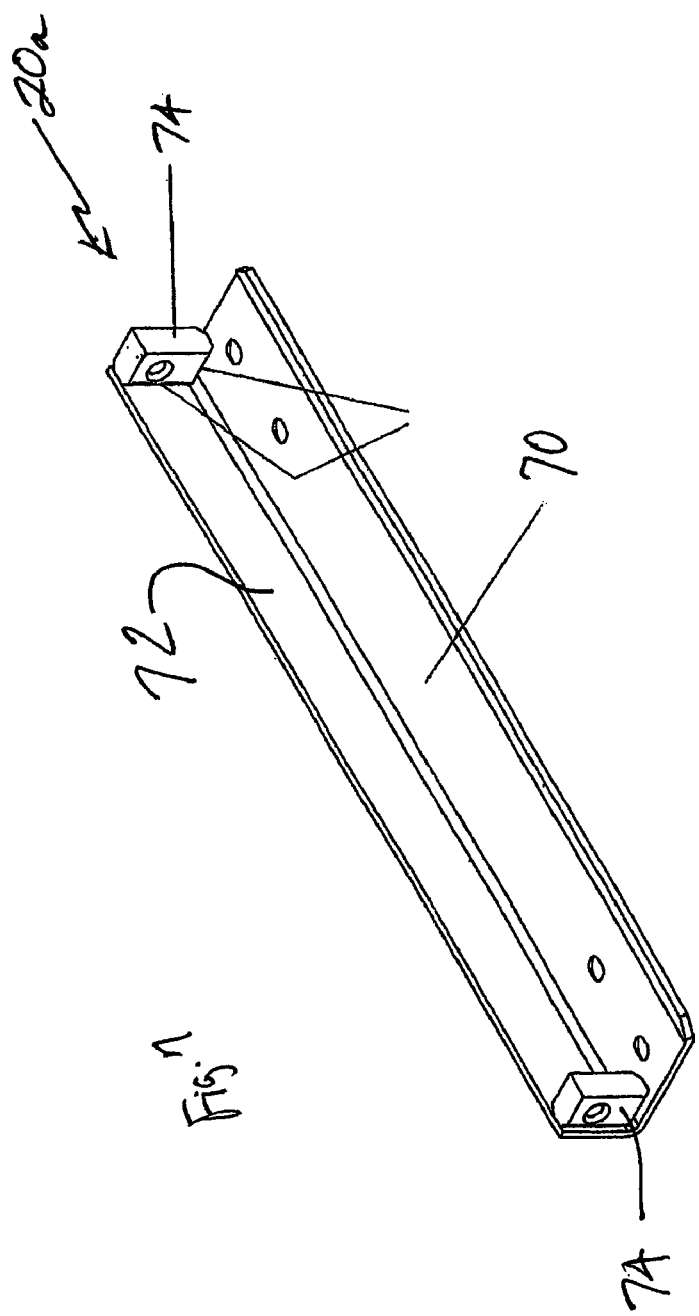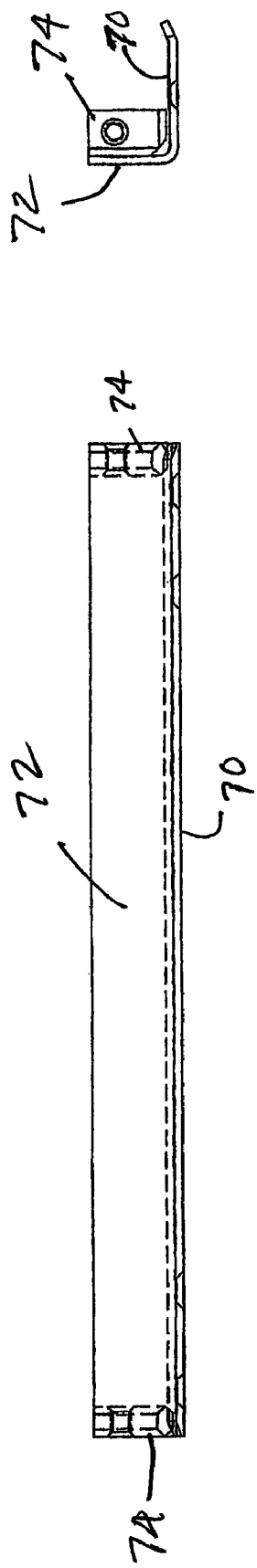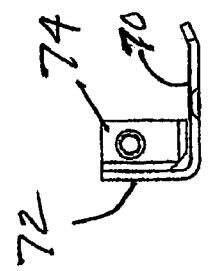

PLATFORM SCALE WITH UNDER-PLATFORM MOUNTED LOAD CELL PROTECTION CASES FOR REDUCING SIDE FORCES

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to weighing apparatus. More particularly, the invention relates to portable, low profile weighing scales. Most particularly, the invention relates to a weighing scale system for use in weighing the load carried by each axle of a vehicle. The weighing scale provided by this invention is useful for efficiently, reliably and accurately weighing the load carried by the axles of a vehicle.

2. Background Information

Applicants Kroll et al. discloses scales in U.S. Pat. Nos. 4,714,121, 4,979,581, 5,232,064, 5,646,376, and 5,894,112, and load cells in U.S. Pat. Nos. 4,775,018, 4,813,504, and 5,228,527. The scales and load cells handle a broad range of capacities and have varying degrees of accuracy. Additionally, the scales have varied designs in terms of height, weight, portability and method of use. A common design factor shared by all of these scales and load cells is that in each, the mounting of the load cell in and to the scale is unique and provides a significant advantage over the prior art.

Wheel scales or platform scales are commonly used to measure axle weight loads of vehicles and aircraft. These scales are designed to be used singly, or multiply in concert, with the vehicle rolled onto the scale(s) and the weight of the vehicle thus determined with the wheels resting on the scale(s). Platform scales with sufficient capacity to weight the axle load of large vehicles, such as semi tractor and trailer units, are quite massive. Platform scales with large weighing platforms are common, but their size renders the scale immobile. Thus, vehicles to be weighed must be moved to the permanently placed scale, which may be a long distance away.

The small footprint scales do not have the capacity to weigh the axles of large vehicles, such as semi tractor and trailer units.

Thus, there is an unmet need for a weighing scale that can be transported to any selected weighing site, yet includes the capacity to obtain the weight of large vehicle axles efficiently, reliably and accurately. The invention provides a weighing scale system, which is believed to fulfill the need and to constitute an improvement over the background technology.

BRIEF SUMMARY OF THE INVENTION

The present invention provides an apparatus and method for weighing articles that can be rolled onto the weighing scale. In one embodiment, the apparatus includes a weighing scale apparatus comprising a base for contacting a support surface. A platform is present for contact with a load, the platform disposed above and in operational contact with the base. The platform has a predetermined number of load cell mounts, each one of the load cell mounts providing a deflection gap between a load cell and the platform. A number of load cells equal to the number of load cell mounts are present, with each one of the load cells being attached to one of the load cell mounts of the platform and being positioned between the base and the platform. A number of engagement members equal to the number of load cells are present, with each one of the engagement members being in operational contact with the base and one of the load cells.

In another embodiment, the apparatus includes a weighing scale assembly comprising at least two weighing scale units, each unit including a base for contacting a support surface. A platform is present for contact with a load, the platform disposed above and in operational contact with the base. The platform has a predetermined number of load cell mounts, each one of the load cell mounts providing a deflection gap between a load cell and the platform. A number of load cells equal to the number of load cell mounts are present, with each one of the load cells being attached to one of the load cell mounts of the platform and being positioned between the base and the platform. A number of engagement members equal to the number of load cells are present, with each one of the engagement members being in operational contact with the base and one of the load cells. An electrical control/display and a power supply are operatively connected to the at least two weighing scale units for displaying the total weight supported by the scale assembly.

In another embodiment, the method of weighing an article with a weighing scale assembly includes the steps of providing a weighing scale assembly comprising at least two weighing scale units, each unit including a base for contacting a support surface. A platform is present for contact with a load, the platform disposed above and in operational contact with the base. The platform has a predetermined number of load cell mounts, each one of the load cell mounts providing a deflection gap between a load cell and the platform. A number of load cells equal to the number of load cell mounts are present, with each one of the load cells being attached to one of the load cell mounts of the platform and being positioned between the base and the platform. A number of engagement members equal to the number of load cells are present, with each one of the engagement members being in operational contact with the base and one of the load cells. An electrical control/display and a power supply are operatively connected to the at least two weighing scale units for displaying the total weight supported by the scale assembly.

Each scale unit of the weighing scale assembly is positioned on a support surface. The axled vehicle is moved such that each scale unit supports one end of an axle thereof and the weight of each axle determined by observing the output of the electrical display.

The features, benefits and objects of the invention will become clear to those skilled in the art by reference to the following description, claims and drawings.

BRIEF DESCRIPTION OF THE SEVERAL VIEWS OF THE DRAWING

FIG. 3 is a top plan view of the platform portion of the scale unit.

FIG. 4 is a side plan view of the platform portion of the scale unit.

FIG. 5 is a bottom plan view of the platform portion of the scale unit.

FIG. 6 is a perspective bottom view of the platform portion of the scale unit.

FIG. 7 is a perspective view of one of the base portions of the scale unit.

FIG. 8 is an end view of one of the base plate portions of the scale unit

FIG. 9 is a side view of one of the base plate portions of the scale unit

DETAILED DESCRIPTION

The present invention is a weighing scale assembly that is useful for determining the axle weigh of heavy vehicles, although the weighing scale assembly has many other applications, as well.

Figure 1:
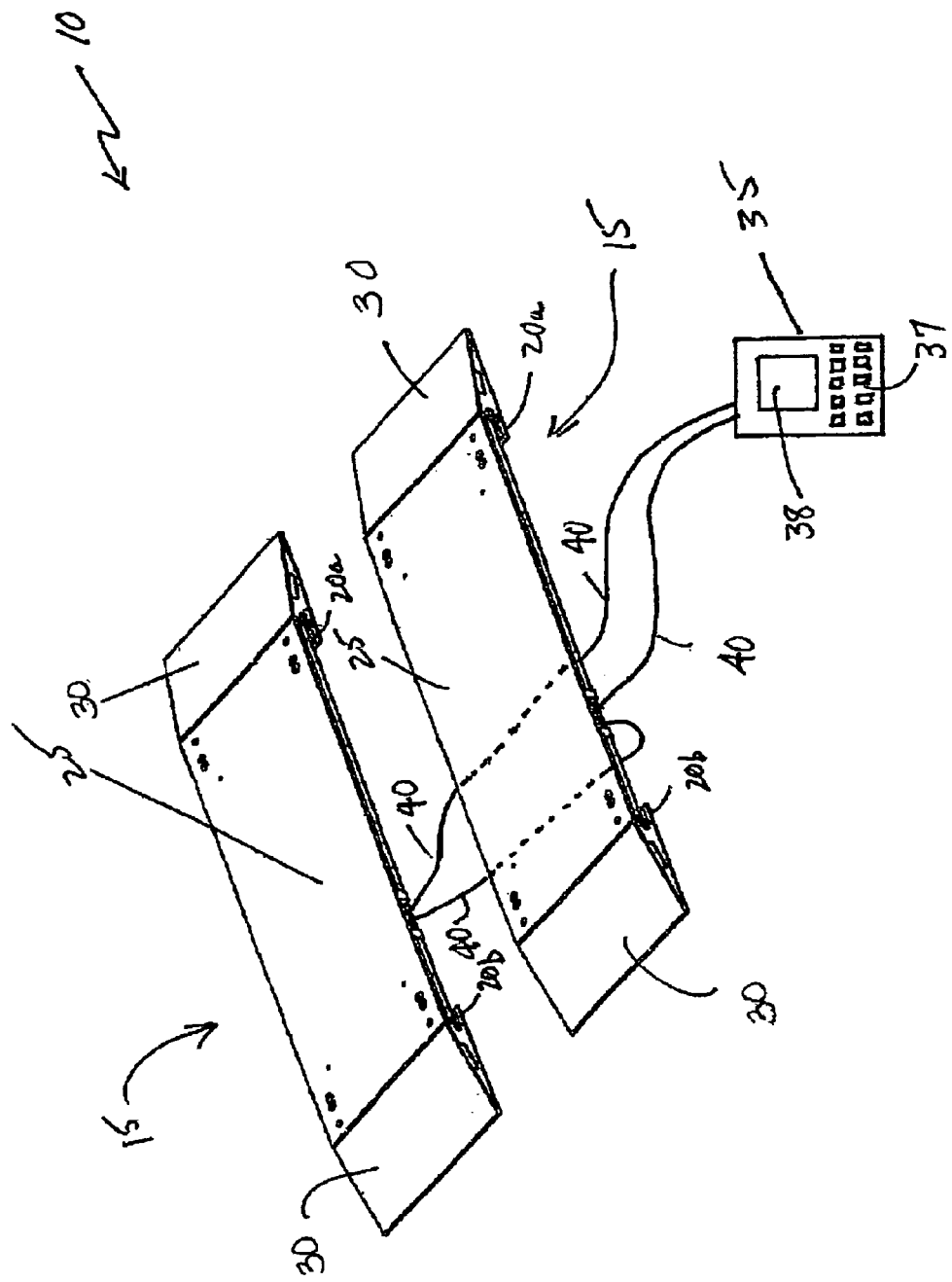
FIG. 1 is a perspective view of a weighing scale assembly of the present invention.

FIG. 1 show one embodiment of the present invention, illustrated and generally indicated by the reference numeral 10. Referring to FIG. 1, the high capacity weighing scale assembly 10 includes a pair of weighing scale units 15, positioned on a support surface, such as the ground or other hard surface. Each scale unit 15 includes a base 20 for contacting the support surface and a platform 25 for contact with a load, the platform 25 disposed above and in operational contact with the base 20. The base 20 comprises individual support portions 20a and 20b secured to opposite ends of the platform 25, the base portions 20a, 20b elevating the platform 25 above the support surface. Elevation permits engagement, lifting and transportation of the scale units 15 by a forklift or other lifting means. The base support portions 20a and 20b preferably extend across the full width of the platform 25. In order to facilitate movement of axled vehicles on and off of the weighing scale assembly 10, a ramp member 30 is secured to each of the base portions 20a, 20b, as illustrated in FIG. 1. Preferably, each ramp member 30) extends the full width of the base portions 20a, 20b.

The scale units 15 are communicatively connected to an electronic control and display unit 35 remote from the scale units 15 by conductor wires 40. The power unit for the apparatus is preferably one or more batteries, with the power unit preferably contained within the control/display unit 35. A front view of the face of the control/display unit 35 is shown in FIG. 1, the face including a number of control buttons 37 and a display screen 38. The weighing scale assembly 10 is readily positioned to accommodate various width vehicle axles by separating one scale unit 15 from the other. The flexible conductor wires 40 between each scale unit 15, and from one scale unit 15 and to the control and display unit 35, provides facile configuration of the weighing scale assembly 10 to various sized and configured axled vehicles. Likewise, the platform 25 can be fabricated in various lengths to accommodate larger vehicle tires at the end of each axle of the vehicle. In addition, two or more scale units 15 can be connected end to end, as described later, to accept multiple, closely spaced, axles present in, for example, semi tractors and trailers.

Figure 2:
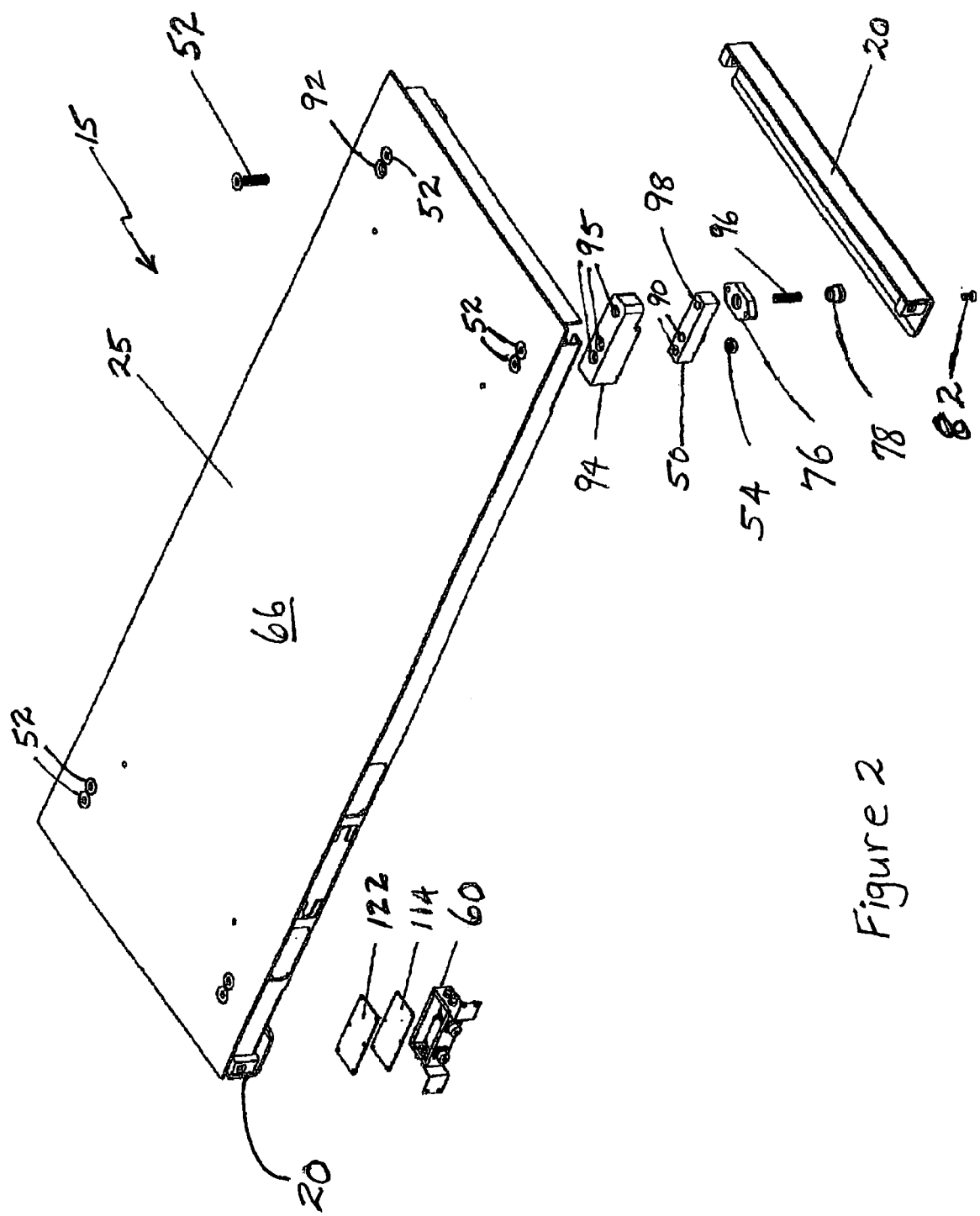
FIG. 2 is an exploded perspective view of one scale unit of the present invention.

Referring now to FIG. 2, one of the weighing scale units 15 is shown in a perspective, exploded view. The weighting scale unit 15 includes a base member 20 and a platform member 25 secured to the base member 20. The base member 20 includes individual support portions 20a and 20b secured to opposite ends of the platform member 25, the base portions 20a, 20b elevating the platform member 25 above the support surface. The platform member 25 includes a plurality of load cell mounts 45, each for mounting a load cell 50 thereto. In the present embodiment, there are four load cell mounts 45 and four associated load cells 50, with one mount 45 and associated load cell 50 disposed at each corner of the platform member 25. A greater number of load cell mounts 45 and associated load cells 50 may be included in the present invention with equivalent results. The load cells 50 are preferably shear beam load cells 50, described in detail below. Each rectangular load cell 50 is secured at one end to the load cell mount 45 by a pair of threaded fasteners 52 extending from the top surface 66 of the platform member 25 and through the load cell 50 to engage threaded nuts 54. In order to further protect the load cells 50, each load cell 50 is secured within a load cell case 94. The case 94 is positioned between the load cell 50 and the platform member 25, the case 94 enclosing the load cell 50 except at the bottom surface of the load cell. The top surface of the load cell case 94 includes apertures 95 to accommodate the pair of pair of threaded fasteners 52 extending from the top surface 66 of the platform member 25 and through the load cell 50 to engage threaded nuts 54, as well as the threaded fastener 96 connecting the load cell 50 to the foot nut 78. The load cell case 94 is shown in greater detail in FIGS. 18–21.

The load cells 50 engage and vertically support the platform member 25 via engagement means 56, also described in detail below. Other load cell mount configurations are anticipated. However, the present load cell mount configuration is preferable for the type of load cells 50 being used in this invention.

The load cells 50 are operatively connected to a summing box 60, also secured to the platform member 25, by conductor wires 62 that are routed interior the platform member 25. The conductor wires 62 are routed through the rectangular tube members 64 that compose the platform member 25. The summing box 60 of each scale unit 15 are communicatively connected to the electronic control and display member 35, as illustrated in FIG. 1.

The platform member 25 includes a top contact surface 66 and a bottom surface 68. The platform member 25 is composed of a flat bundle of rectangular tube members 64 secured between the top contact surface plate 66 and the bottom surface plate 68. The bundle of tube members 64 provides strength and durability for the platform member 25, is best seen in FIGS. 5–6. The bottom surface 68 of the platform member 25 does not cover the ends of the tube members 64 adjacent the base portions 20a, 20b, thereby providing access to the load cell mounts 45 and attached load cells 50 of the platform member 25. The top contact surface 66 of the platform member 25 covers and protects the load cells 50 summing box 60 and associated conductor wires 62 during operation of the weighing scale units 15.

Referring now to FIGS. 7–9, several detailed views of one base portion 20 are shown. Each base portion 20a, 20b comprises an L-shaped structure having one leg portion 70 that contacts the support surface and another leg portion 72 that contacts the platform member 25. Each base portion 20a, 20b is of a length sufficient to span an end of the platform member 25. Positioning members 74 are secured to the platform contacting leg portion 72 at each end thereof, the positioning members 74 each fitting into a notch at a corner of the platform member 25, as shown in FIG. 2.

Referring again to FIG. 2, a foot member 76 and an associated foot nut 78 is secured to the base portions 20a and 20b at each end thereof. Each foot member 76 and foot nut 78 is positioned on the support surface contacting leg 70 of each base portions 20a, 20b such that a threaded cavity 80 of the foot nut 78 is in register with a load cell 50 on the platform 25. Each foot member 76 is secured to the base portions 20a, 20b by threaded connectors 82 that engage threaded apertures 84 in the foot member 76. The foot nut 78 rests on one leg 70 of the base portion 20 within an aperture 86 in the foot member 76. Detailed views of the foot nut 78 and foot member 76 are shown in FIGS. 11–12 and FIGS. 13–14, respectively.

Figure 15:
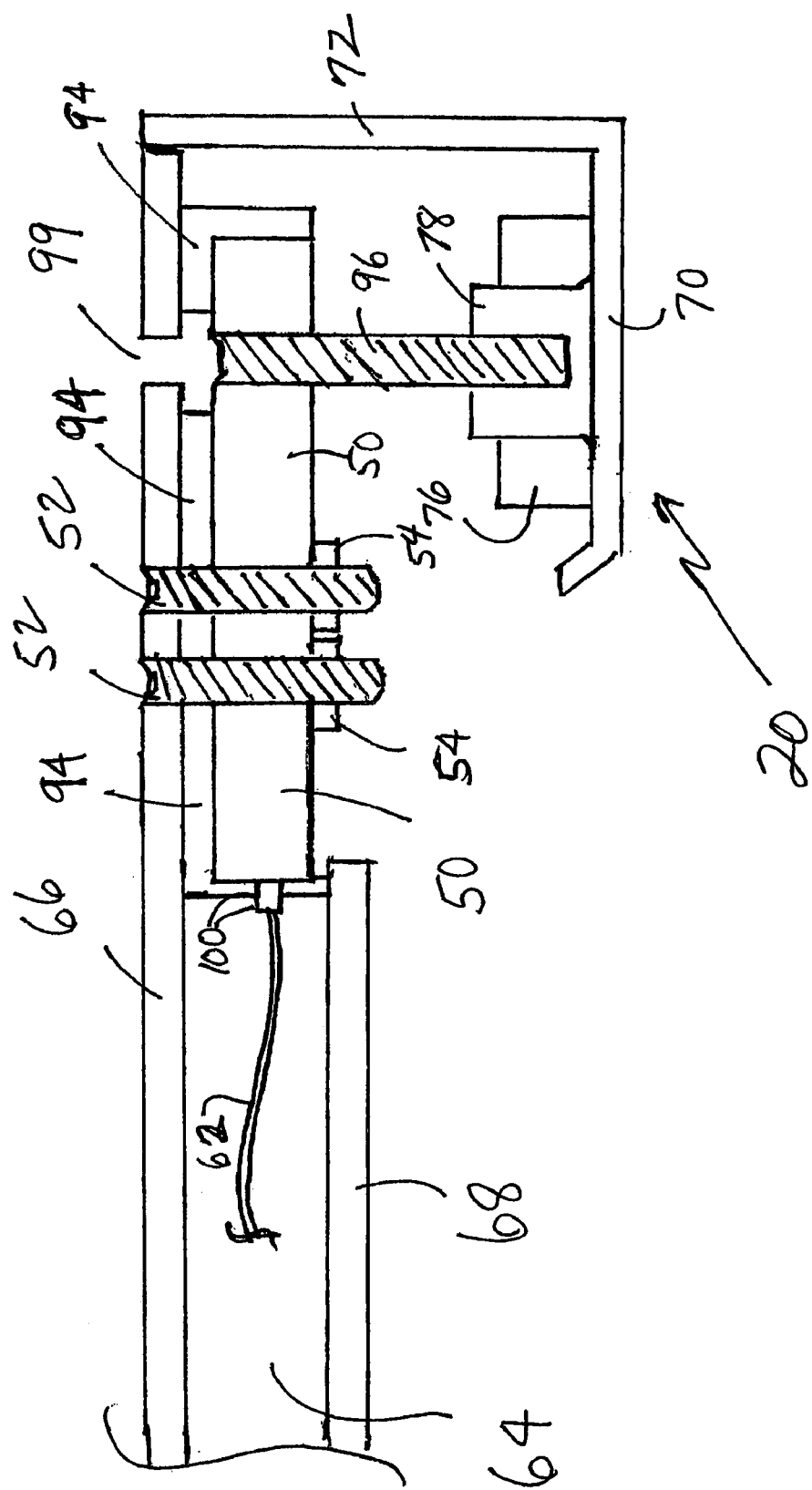
FIG. 15 is a cross sectional view of one of the load cells secured between the base member and the platform member.

Referring now to FIG. 15, the load cell mount 45, load cell 50 and engagement means 56 are shown in cross section. The load cell 45 has an elongated, generally square cross sectional configuration. A pair of mounting apertures 90 is located proximate one end of the load cell 50. The apertures 90 permit the load cell 50 to be mounted to the load cell mount 45 of the platform 25 by the mounting bolts 52 positioned in the platform mounting apertures 92 of the platform 25. A load cell case 94, also functioning as a spacer, is positioned between the load cell mount 45 and the load cell 50, adjacent the load cell mounting apertures 90 and third load cell aperture 98. The load cell case 94 protects the load cell 50, as described above. The load cell case 94 lowers the shear beam load cell 50, thereby extending the load cell 50 away from the platform top surface 66 at an end opposite the threaded fasteners 52 securing the load cell 50 thereto. A threaded fastener 96, passing through a third load cell aperture 98, secures the load cell 50 at the spaced end to one foot nut 78 and associated foot member 76, secured to the base member 20, as illustrated in FIG. 15. Thus, the foot nut 78, the associated foot member 76 and the threaded fastener 96 comprise the engagement means 56 between the load cell 50 and the base member 20. The platform member 25 also contains an access aperture 99 for accessing the threaded fastener 96, allowing the base member 20 to be secured to or removed from the platform 25. Thus, a load placed on the platform member 25 causes a deflection of the load cell 50 at the end opposite the threaded fasteners 52 securing the load cell 50 to the platform member 25. A cable connection 100 is disposed at the end of the load cell 25 to receive an electrical conductor wire 62. The conductor wire 62 provides electrical communication between the load cell 50 and the summing box 60. Strain gauges (not shown) are disposed within the load cell 50 to measure dimensional changes in the load cell 50 caused by the load. The operation of a strain gauge is based on the principle that the electrical resistance of a conductor changes when it is subjected to a mechanical deformation. There are a number of resistance strain gauge types that may be used, including bonded strain gauge, wire gauge, foil gauge and semiconductor gauge. As each strain gauge is mechanically deformed, its length and diameter are altered, resulting in a change in its electrical resistance, which is used to calculate a weight.

The proper orientation of the strain gauges on each mounted and aligned load cell 50 permits accurate weighing irrespective of the exact location of the load relative to the top surface 66 of the platform member 25 that may be due to uneven load placement or tilting of each weighing scale unit 15. The design of the platform members 25, engagement means 56, load cells 50 and base portions 20a, 20b cooperate to permit the proper deflection of the load cell 50 for accurate and repeatable readings without the potentially damaging side load effects and torquing.

Figure 10:
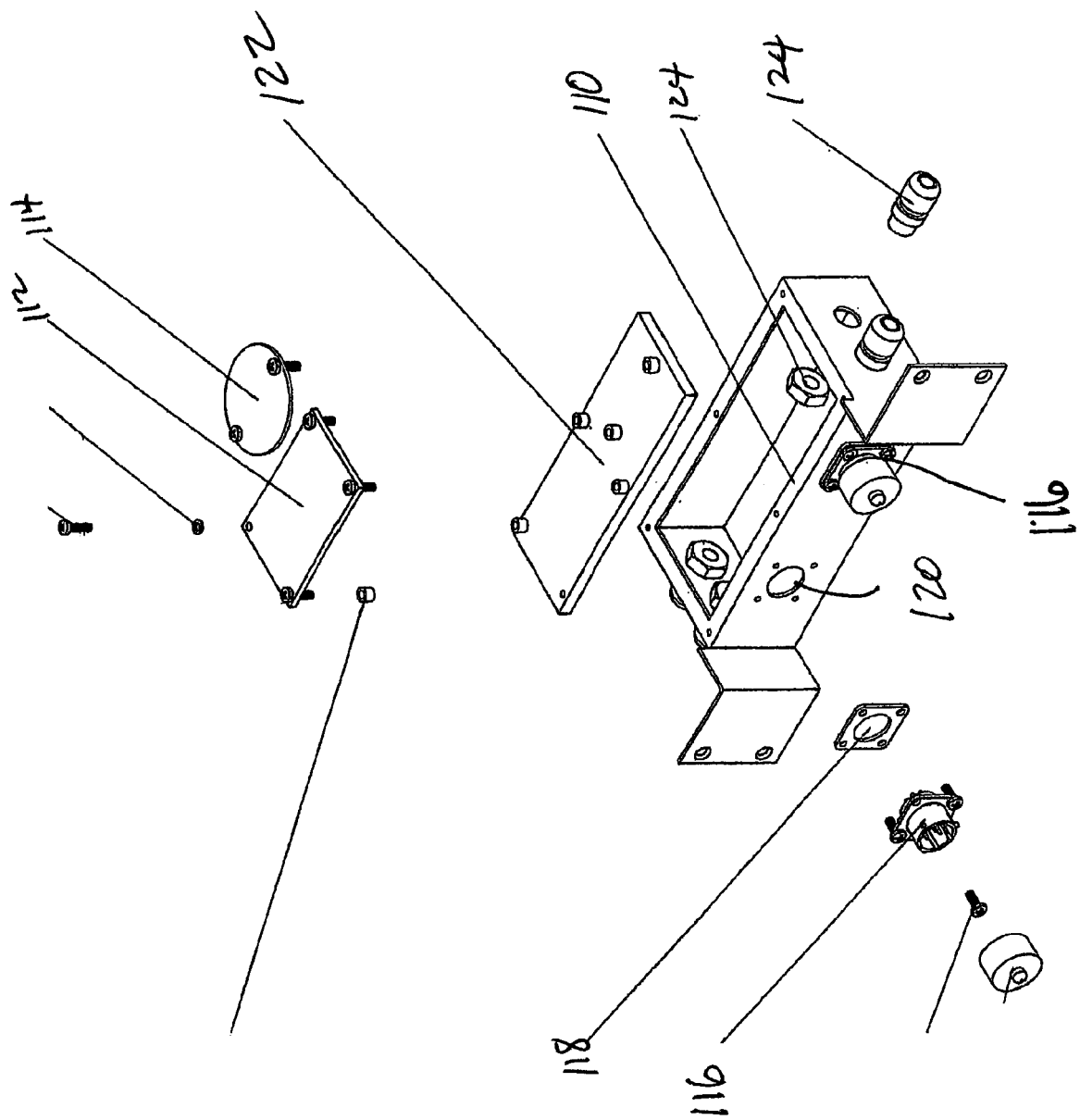
FIG. 10 is an exploded perspective view of the summing box of the scale unit.
Figure 14:
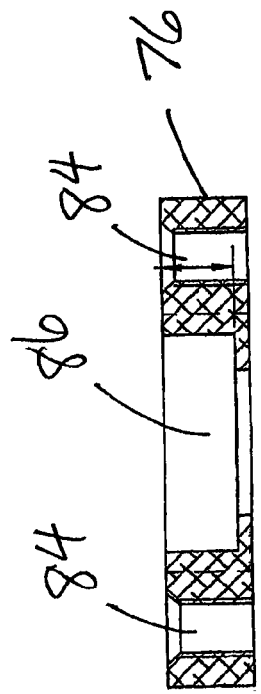
FIG. 14 is a sectional view of the foot member along line 14–14' of FIG. 13.
Figure 13:
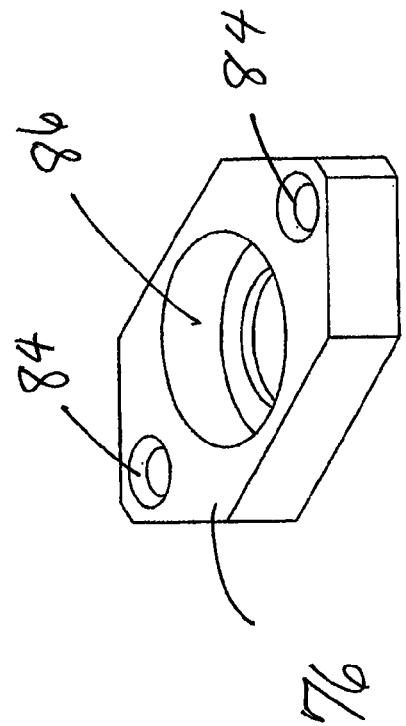
FIG. 13 is a perspective view the foot member of the scale unit of the present invention.
Figure 12:
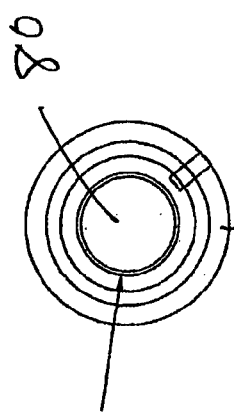
FIG. 12 is a top end view of the foot nut of the scale unit of the present invention.
Figure 11:
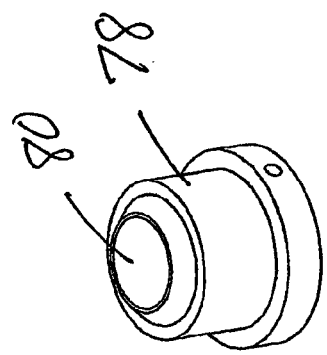
FIG. 11 is a perspective view of the foot nut of the scale unit of the present invention.

Referring now to FIG. 10, an exploded view of the summing box 60 is shown. The summing box 60 is mounted within the platform member 25, along one edge thereof, and in communication with each load cell 50 vial the conductor wires 62 which are routed through the tube members 64 that make up the skeleton of the platform member 25. The summing box 60 includes a metal box member 100 that mounts within the platform member 25. Within the box 100 are printed circuit boards 112. 114 that receive and process electrical signals from the load cells 50. A pair of multi-pin connector members 116 is sealed by gaskets 118 into apertures 120 in the metal box member 100. A cover plate 122 seals the box member 100. A plurality of straight through connectors 124 bring the conductor wires 62 into the summing box 60 from each of the load cells 50 to connect with the printed circuit boards 112, 114. The summing box 60 is connected by the multi-pin plug connectors 116 and connector wire 40 to the electronic control/display device 35 to signal the total weight supported by each scale unit 15.

Figure 16:
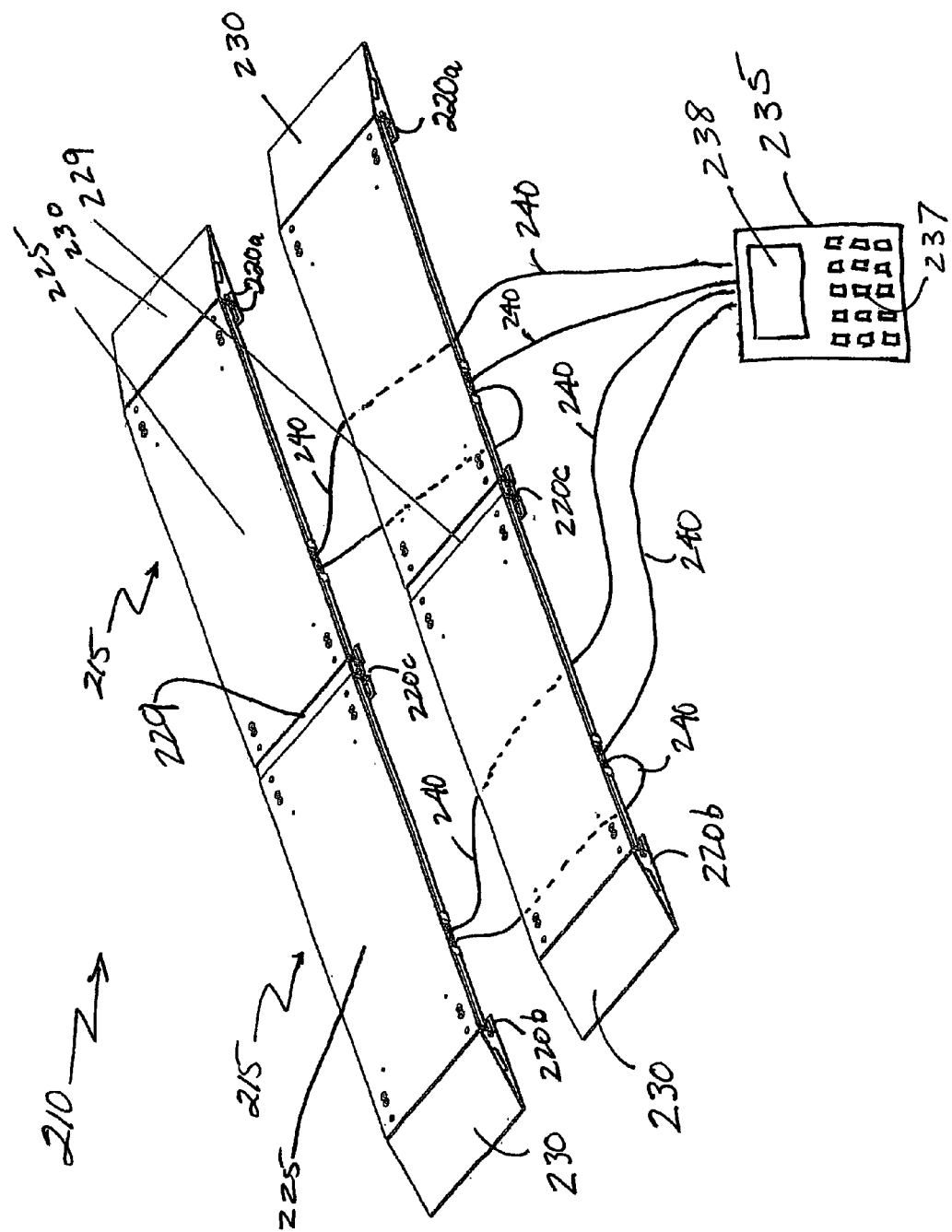
FIG. 16 is a perspective view of another weighing scale assembly of the present invention.

FIG. 16 show another embodiment of the present invention, illustrated and generally indicated by the reference numeral 210. Referring to FIG. 16, the high capacity weighing scale assembly 210 includes two pair of weighing scale units 215, positioned on a support surface, such as the ground or other hard surface. Each pair of scale units 215 includes a base 220 for contacting the support surface and platform members 225 for contact with a load, the platform members 225 disposed above and in operational contact with the base 220. The base 220 comprises an individual support portion 220c between the two adjacent platform members 225 of the pair of scale units 215, and individual support portions 220a, 220b secured to opposite ends of the platform members 225. The base portions 220a, 20b, 220c elevate the platform members 225 above the support surface. The base support portions 220a, 220b and 220c preferably extend across the full width of the platforms 225. In order to facilitate movement of axled vehicles on and off of the weighing scale assembly 210, a ramp member 230) is secured to each of the base portions 220*a*, 220*b* at opposite ends of the pair of scale units 215, as illustrated in FIG. 16. Preferably, each ramp member 230 extends the full width of the base portions 220*a*, 220*b*.

The scale units 215 are communicatively connected to an electronic control and display unit 235 remote from the scale units 215 by conductor wires 240. The power unit for the apparatus is preferably one or more batteries, with the power unit preferably contained within the control/display unit 235. A front view of the face of the control/display unit 235 is shown in FIG. 16, the face including a number of control buttons 237 and a display screen 238. The weighing scale assembly 210 is readily positioned to accommodate various width vehicle axles by separating one pair of scale units 215 from the other. The flexible conductor wires 240 between each scale unit 215, and from one pair of scale units 215 and to the control and display unit 235, provides facile configuration of the weighing scale assembly 210 to various sized and configured axled vehicles. Likewise, the platform members 225 can be fabricated in various lengths to accommodate larger vehicle tires at the end of each axle of the vehicle. The embodiment of the invention shown in FIG. 16 is designed to accept multiple, closely spaced, axles present in, for example, semi tractors and trailers.

Figure 17:
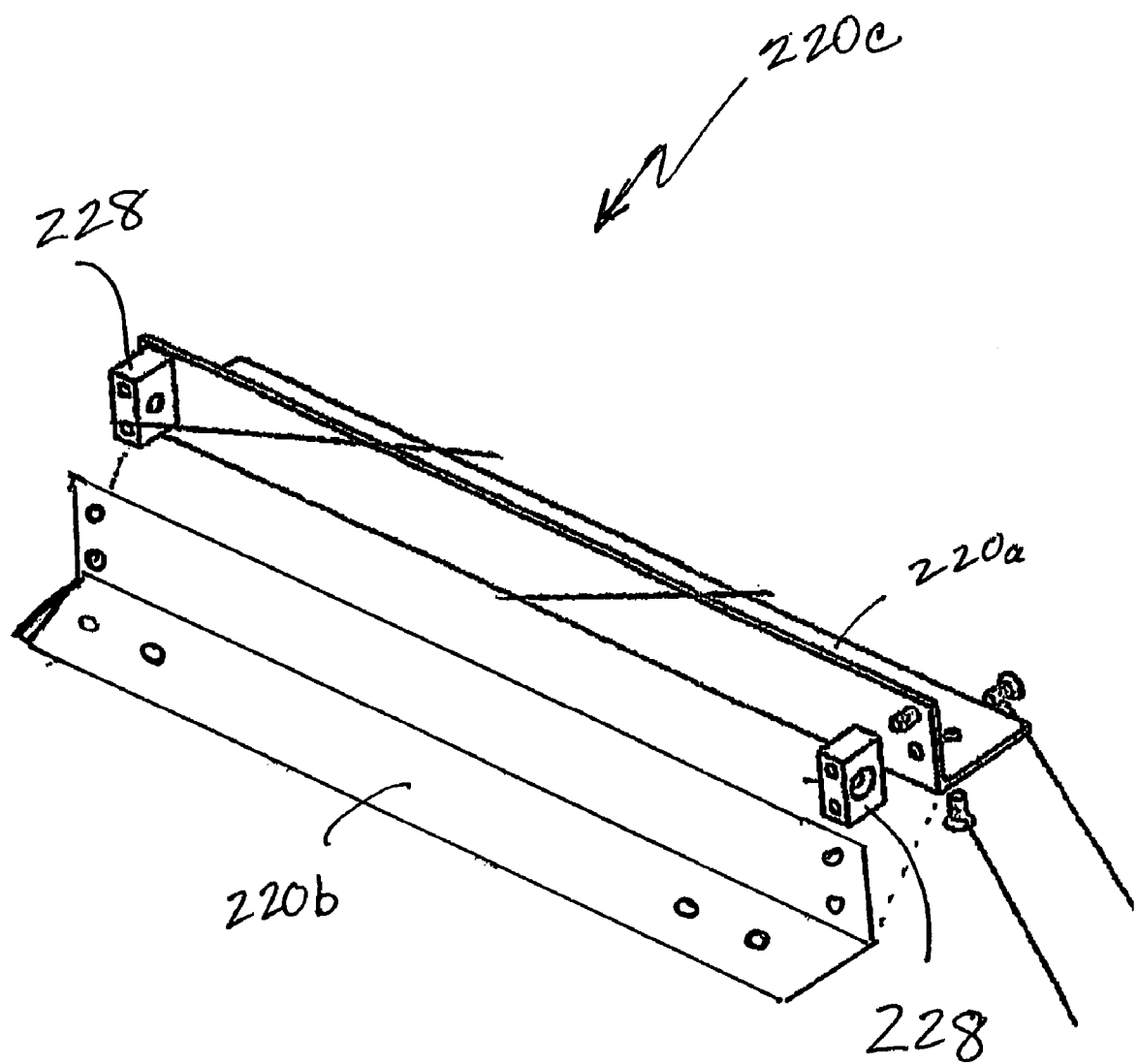
FIG. 17 is a perspective view of a base portion for connecting two weighing scale units of the present invention.
Figure 20:
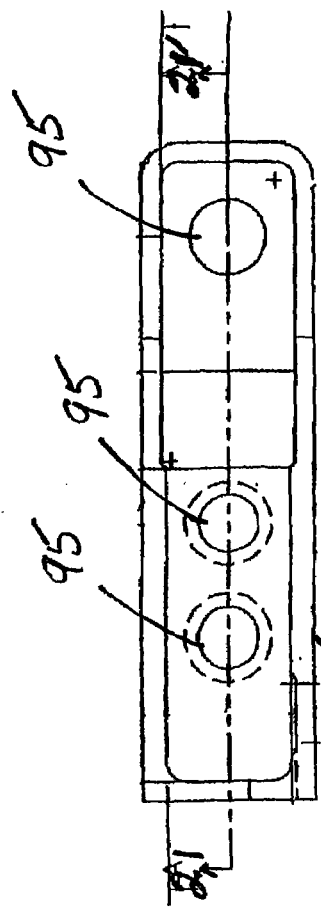
FIG. 20 is a bottom plan view of a load cell case of the scale unit of the present invention.
Figure 21:
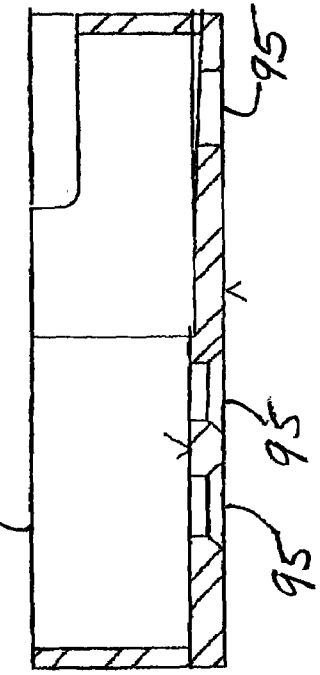
FIG. 21 is a cross sectional view along line 21–21' of FIG. 20 of the load cell case of the scale unit of the present invention.
Figure 19:
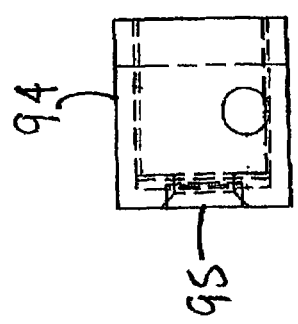
FIG. 19 is an end view of a load cell case of the scale unit of the present invention.
Figure 18:
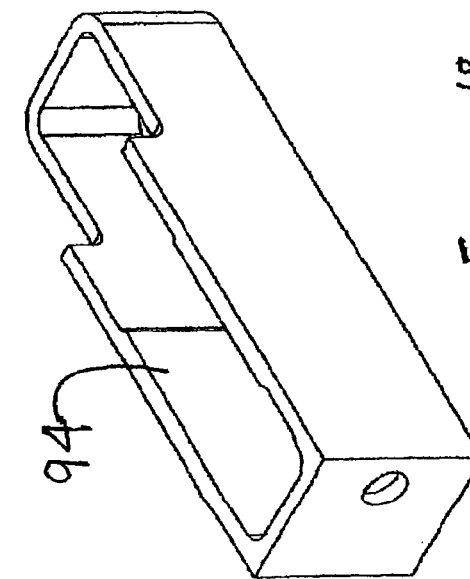
FIG. 18 is a perspective view of a load cell case of the scale unit of the present invention.

The individual weighing scale units 215, described in detail above, are configured and function in a comparable manner, as described earlier. The base connector portion 220*c* comprises a pair of base support members 220*a*, 220*b* secured back to back with each portion secured at each end to one of a pair of connecting block members 228, as illustrated in FIG. 17. A cover piece 229 is secured over the connecting base portion 220*c* to provide a continuous surface with the two adjacent weighing scale units 215 fastened together as seen in FIG. 16.

Although the scale embodiments having one and two units have been described, the teachings of this invention are applicable to scales having three or more units.

The descriptions above and the accompanying drawings should be interpreted in the illustrative and not the limited sense. While the invention has been disclosed in connection with an embodiment or embodiments thereof, it should be understood that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A weighing scale apparatus comprising:
   (a) a base for contacting a support surface;
   (b) a platform for contact with a load, the platform disposed above the base, the platform having a predetermined number of load cell mounts, each one of the load cell mounts providing a deflection gap between a load cell and the platform;
   (c) a load cell protection case connected below each load cell mount, each load cell case having a load cell enclosure with an open bottom:
   (d) a number of single ended, shear beam load cells equal to the number of load cell mounts, each one of the load cells being disposed in the load cell enclosure of a load cell case, each load cell having a body of a predetermined length with a first end connected to the platform and a second end extending therefrom; and
   (e) an engagement member connected to the second end of each load cell, each one of the engagement members being in operational contact with the base, each engagement member including a foot disposed on the top surface of the base and having a vertically disposed threaded aperture, and a threaded engagement fastener of a predetermined length, the engagement fastener bottom end being threadedly disposed in the foot aperture and the engagement fastener top end being threadedly disposed in the second end of the load cell.

2. The weighing scale apparatus of claim 1 wherein, the base comprises opposed linear angle foot members at opposite ends of the platform.

3. The weighing scale apparatus of claim 1 wherein, each one of the load cell mounts has at least one support position upon which one of the load cells is attached.

4. The weighing scale apparatus of claim 1, further including an electrical controlldisplay and a power supply, the electrical control/display in communication and remote from the weighing scale, the power supply being located in the electrical control/display.

5. The weighing scale apparatus of claim 1, further including a summing box for summing output from the predetermined number of load cells.

6. The weighting scale apparatus of claim 5 wherein, the summing box is in communication with an electrical control/display.

7. The weighing scale apparatus of claim 5 wherein, the summing box is mounted to the platform of the weighing scale apparatus.

8. The weighing scale apparatus of claim 1 wherein, the predetermined number of load cells mounts, load cells and engagement members is at least four.

9. The weighing scale apparatus of claim 1 wherein, the predetermined number of load cell mounts, load cells and engagement members is four with each load cell secured adjacent a corner of the platform.

10. The weighing scale apparatus of claim 1 wherein the foot includes a foot member securing a foot nut to a surface of the base.

11. The weighing scale apparatus of claim 1, further including a pair of opposed access ramps, each ramp secured to the base at opposed ends of the weighing scale apparatus.

12. The weighing scale apparatus of claim 1 wherein, the platform comprises a planar, bundle of rectangular tube members secured between a top contact surface plate and a bottom surface plate.

13. A weighing scale assembly comprising:
   (a) at least two weighing scale units, each weighing scale unit including;
      (i) a pair of L-shaped bases for contacting a support surface, each base including a horizontal bottom leg for contacting the support surface and a vertical top leg extending upwardly from the bottom leg;
      (ii) a platform for contact with a load, the platform having four corners, the platform disposed above the base, the platform having four load cell mounts, each one of the load cell mounts disposed proximate a corner of the platform and providing a deflection gap between a load cell and the platform, each load cell mount having a pair of mounting apertures and an access aperture;
      (iii) four load cell cases, each disposed below a load cell mount, each load cell case having a top member which abuts the load cell mount and a continuous side member extending downwardly from the periphery of the top member to define a load cell enclosure with an open bottom, the top member having a pass through apertures aligned with the mounting apertures and adjustment access aperture of the platform:

(iv) a four single ended, shear beam load cells, each one of the load cells being disposed in the load cell enclosure of a load cell case, each load cell having a body of a predetermined length with a first end and second end disposed toward the platform corner, and a pair of mounting apertures disposed toward the first end and aligned with the mounting apertures of the platform, and a threaded fastening aperture disposed toward the second end and aligned with the adjustment access aperture of the platform, each load cell being fastened to the platform at its first end by a pair of threaded fasteners disposed through the mounting apertures, the pass through apertures of the case, and the mounting apertures of the platform, each fastener threaded bottom end extending below the load cell body and having a threaded nut attached thereto;

(iv) four engagement members, each one of the engagement members being in operational contact with the base and one of the load cells, each engagement member including a foot nut disposed on the top surface of the base bottom leg and having a vertically disposed threaded aperture, a foot member fastening the foot nut to the bottom leg, and a threaded engagement fastener of a predetermined length, the engagement fastener bottom end being threadedly disposed in the foot nut aperture and the engagement fastener top end being threadedly disposed in the fastening aperture of the load cell; and whereby, in use, a load applied to the platform is directed to the first end of each load cell in cooperation with the second end of each load cell being supported by the respective engagement members, and the protection of the load cells by the respective load cell cases, optimizing load sensing deflection of the single ended shear beam load cells; and (b) an electrical control/display and a power supply operatively connected to the at least two weighing scale units for displaying the total weight supported by the scale assembly.

14. The weighing scale assembly of claim 13, further including a summing box for each scale unit, the boxes summing output from the predetermined number of load cells of each scale unit.

15. The weighing scale assembly of claim 14 wherein, the summing boxes are in communication with the electrical control/display.

16. The weighing scale assembly of claim 14 wherein, the summing box is mounted to the platform of the weighing scale unit.

17. The weighing scale assembly of claim 13 wherein, the at least two weighing scale units are operatively connected in series to the electrical control/display and the power supply, the power supply being located in the electrical control/display, and the electrical control/display being remote from the weighing scale units.

18. The weighing scale assembly of claim 13, further including at least two pair of opposed access ramps, each ramp secured to the base at opposed ends of each of the at least two weighing scale units.

19. The weighing scale assembly of claim 13 wherein, the platform comprises a planar, bundle of rectangular tube members secured between a top contact surface plate and a bottom surface plate.

20. A vehicle weighing scale assembly comprising:

(a) a pair of side-by-side weighing scale units separated a predetermined distance from each other corresponding to the track or wheel width of a vehicle to be weighed, each weighing scale unit including front and rear tandem scales, each scale including:

(i) a pair of L-shaped bases of a predetermined length for contacting a support surface, each base including a horizontal bottom leg for contacting the support surface and a vertical top leg extending upwardly from the bottom leg;

(ii) a rectangular platform for contact with a load, the platform having front and rear ends and left and right sides defining a predetermined platform width equivalent to the length of the bases and a predetermined platform length which forms a vehicle travel path and which is greater than the platform width, the platform further having four corners, the platform disposed above the base, the platform having four load cell mounts, each one of the load cell mounts disposed proximate a corner of the platform and providing a deflection gap between a load cell and the platform, each load cell mount having a pair of mounting apertures and an access aperture;

(iii) four load cell cases, each disposed below a load cell mount, each load cell case having a top member which abuts the load cell mount and a continuous side member extending downwardly from the periphery of the top member to define a load cell enclosure with an open bottom, the top member having a pass through apertures aligned with the mounting apertures and adjustment access aperture of the platform;

(iv) a four single ended, shear beam load cells, each one of the load cells being disposed in the load cell enclosure of a load cell case, each load cell having a body of a predetermined length with a first end and second end, the body being disposed longitudinally with respect to the lengthwise travel path of the platform and the second end being disposed toward the platform corner, and a pair of mounting apertures disposed toward the first end and aligned with the mounting apertures of the platform, and a threaded fastening aperture disposed toward the second end and aligned with the adjustment access aperture of the platform, each load cell being fastened to the platform at its first end by a pair of threaded fasteners disposed through the mounting apertures, the pass through apertures of the case, and the mounting apertures of the platform, each fastener threaded bottom end extending below the load cell body and having a threaded nut attached thereto;

(iv) four engagement members, each one of the engagement members being in operational contact with the base and one of the load cells, each engagement member including a foot nut disposed on the top surface of the base bottom leg and having a vertically disposed threaded aperture, a foot member fastening the foot nut to the bottom leg, and a threaded engagement fastener of a predetermined length, the engagement fastener bottom end being threadedly disposed in the foot nut aperture and the engagement fastener top end being threadedly disposed in the fastening aperture of the load cell, the engagement fastener having a length sufficient to elevate the load cell, load cell case and platform off of the ground a predetermined distance for placement of lift fork for lifting;

whereby, in use, a load applied to the platform is directed to the first end of each load cell in cooperation with the second end of each load cell being supported by the respective engagement members, and the protection of the load cells by the respective load cell cases, optimizing load sensing deflection of the single ended shear beam load cells; and (b) each weighing scale unit further including:
  (i) a base connector disposed between the rear end of the front scale and the front end of the rear scale and attaching the scales in tandem; and
  (ii) an entry ramp connected to the front end of the front scale and an exit ramp connected to the rear end of the rear scale;

(c) an electrical control/display and a power supply operatively connected to the two pairs of weighing scale units for displaying the total weight supported by the scale assembly.

21. The weighing scale assembly of claim 20 wherein, the base comprises a connector portion positioned between a pair of platform members and connected thereto, and opposed linear angle foot members secured at opposite ends of the pair of platform members.

22. The weighing scale assembly of claim 21, further including a pair of opposed access ramps, each ramp secured to the base at opposed ends of the pair of weighing scale units.

23. A method of weighing an axle of a vehicle comprising the steps of:
  (A) providing a weighing scale assembly comprising;
    (i) a pair of weighing scale units, each unit including;
      (a) a base for contacting a support surface;
      (b) a platform for contact with a load, the platform disposed above the base, the platform having a predetermined number of load cell mounts, each one of the load cell mounts providing a deflection gap between a load cell and the platform;
      (c) a load cell case connected below each load cell mount, each load cell case having a top member which abuts the load cell mount and a continuous side member extending downwardly from the periphery of the top member to define a load cell enclosure with an open bottom;
      (d) a number of single ended, shear beam load cells equal to the number of load cell mounts, each one of the load cells being disposed in the load cell enclosure of a load cell case, each load cell having a body of a predetermined length with a first end connected to the platform and a second end extending therefrom; and
      (e) an engagement member connected to the second end of each load cell, each one of the engagement members being in operational contact with the base, each engagement member including a foot disposed on the top surface of the base and having a vertically disposed threaded aperture, and a threaded engagement fastener of a predetermined length, the engagement fastener bottom end being threadedly disposed in the foot aperture and the engagement fastener top end being threadedly disposed in the second end of the load cell,
  (B) positioning each scale unit of the weighing scale assembly on a support surface;
  (C) moving an axled vehicle onto the scale assembly such that each scale unit supports one end of an axle thereof; and
  (D) observing the output of the electrical display.

* * * * *